United States Patent [19]

McNinch, Jr.

[11] Patent Number: 5,071,200

[45] Date of Patent: Dec. 10, 1991

[54] ABS PRESSURE REAPPLY LOGIC

[75] Inventor: Joseph H. McNinch, Jr., Livonia, Mich.

[73] Assignee: Eaton Corporation, Cleveland, Ohio

[21] Appl. No.: 420,802

[22] Filed: Oct. 12, 1989

[51] Int. Cl.$^5$ ............................................. B60T 8/64
[52] U.S. Cl. ................................. 303/110; 364/426.02
[58] Field of Search ............... 303/104, 109, 110, 119; 364/426.02

[56] References Cited

U.S. PATENT DOCUMENTS

| | | | |
|---|---|---|---|
| 3,556,610 | 1/1971 | Leiber | 303/119 |
| 3,929,383 | 12/1975 | Urban et al. | 303/40 X |
| 4,094,556 | 6/1978 | Okamoto et al. | 303/109 |
| 4,511,971 | 4/1985 | Dittner et al. | 303/110 X |
| 4,585,280 | 4/1986 | Leiber | 303/110 |
| 4,717,209 | 1/1988 | Hagiya et al. | 303/110 |
| 4,741,580 | 3/1988 | Matsubara et al. | 303/104 |
| 4,852,951 | 8/1989 | Matsuda | 303/109 |
| 4,900,100 | 2/1990 | Higashimata et al. | 303/104 |
| 4,919,494 | 4/1990 | Higashimata et al. | 303/110 |

FOREIGN PATENT DOCUMENTS

| | | | |
|---|---|---|---|
| 0171653 | 8/1986 | Japan | 303/108 |
| 1423442 | 9/1988 | U.S.S.R. | 303/108 |

Primary Examiner—Robert J. Oberleitner
Assistant Examiner—Alfred Muratori
Attorney, Agent, or Firm—H. D. Gordon

[57] ABSTRACT

A control system/method for improving the manner and timing of pressure reapplication in an ABS is provided. The control system/method requires only wheel speed inputs, and time derivatives thereof, and is effective to reapply the vehicle brakes in a manner suitable for any one of low friction, medium friction and high friction operating conditions.

20 Claims, 2 Drawing Sheets

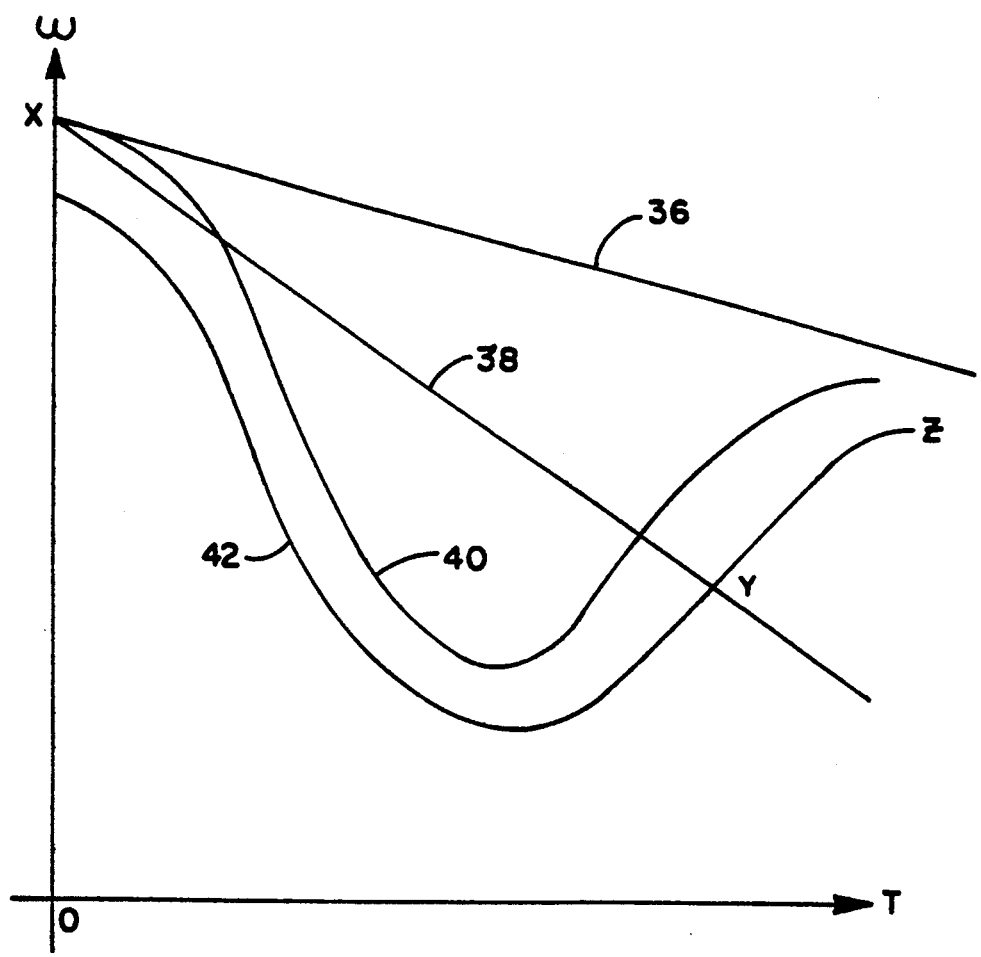
_Fig. 3_

5,071,200

ABS PRESSURE REAPPLY LOGIC

BACKGROUND OF THE INVENTION

1. Field of the Invention

The present invention relates to vehicular Anti-lock Brake Systems ("ABS") and more particularly, to the control system/method for determining when, and in what manner, braking pressure should be reapplied to pressurized fluid actuated vehicular brakes which have been released in response to a sensed actual or incipient wheel-lock condition.

2. Description of the Prior Art

Anti-lock brake systems for vehicular fluid pressure actuated brakes are well known in the prior art. Briefly, as is well known, to provide a desirable maximized combination of vehicle retardation and lateral and transverse vehicle stability, it is important to prevent and/or quickly terminate occurrences of wheel-lock up. In particular, to provide a maximized combination of vehicle retardation (i.e. braking) and vehicle stability, it is advantageous to maintain the slip rate at about twenty to forty percent (20% to 40%). Prior art vehicular ABS, and ABH valves therefor, to accomplish the above may be appreciated by reference to the following U.S. Patents Nos., the disclosures of which are incorporated by reference: 3,604,760; 3,663,070; 3,709,566; 3,747,989; 3,758,167; 3,880,474; 3,881,779; 3,917,358; 3,929,383; 4,094,556; 4,189,192; 4,511,971; 4,585,280; 4,679,866 and 4,762,375.

The prior art ABS typically utilized an ABS valve having an inlet port and a utilization port connected in series between the brake treadle valve controlled by the operator brake pedal and the fluid operated brakes. The ABS valves also had an exhaust port and one or more controllable valve elements, usually solenoid controlled valves controlled by a microprocessor based ABS controller, to provide a fast fill, slow fill, exhaust (release) and often a hold function. The ABS valves often were operated by pulse width modulation techniques or the like to achieve the slow fill and/or hold functions.

In operation, the inlet to the ABS valve received pressurized fluid at a pressure set by the operator's position of the brake pedal. Initially, the ABS valve remained in a fully or substantially fully open (fast fill) position, with the exhaust port closed until actual or incipient wheel-lock was sensed. The ABS valve then assumed the release (exhaust condition) to rapidly release the brakes until conditions requiring a hold or reapply operation were sensed (usually an indication that the wheels were rolling up to vehicle speed), and then the brakes were reapplied as the ABS valve reassumed a fast fill condition until a condition, such as sensing a pressure slightly less than last pressure at which a lock-up condition was sensed, as achieved, at which time the brakes were applied with a less rapidly increasing pressure as the ABS valve assumed the slow fill mode.

While the prior art ABS do provide increased vehicle retardation and/or stability, they are not totally satisfactory, as pressure sensors as well as wheel speed sensors were required, and/or the control system/method for determining at what point and at what rate of pressure increase to reapply the brakes was not satisfactory for low friction, medium friction and high friction surface conditions.

SUMMARY OF THE INVENTION

In accordance with the present invention, the drawbacks of the prior art ABS control systems/methods have been overcome to the extent that an ABS control system/method utilizing only wheel speed, and its first derivative wheel acceleration, as control parameter inputs and responsive to sensed conditions to reapply brake pressure at a time and rate suitable for any one of low friction, medium friction and high friction surface conditions, is provided.

The above is accomplished by not attempting to reapply brake pressure, i.e. maintaining the ABS valve in either the exhaust or hold mode, until the sensed vehicle speed is equal to or greater than a constantly variable speed reference value. Once wheel speed does equal or exceed the wheel speed reference, the pressure is either applied on a fast fill basis, applied in a slow fill basis or not reapplied until further conditions are met, and then on a slow fill basis, depending upon the sensed or calculated value of wheel acceleration.

Accordingly, it is an object of the present invention to provide a new and improved control method/system for controlling the pressure reapply timing and rate in an ABS system utilizing only wheel speed and/or wheel acceleration as control parameter inputs.

This and other objects and advantages of the present invention will become apparent from a reading of the following description of the preferred embodiment(s) taken in connection with the attached drawings.

BRIEF DESCRIPTION OF THE DRAWINGS

FIG. 3 is a graph illustrating determination of the reapply wheel speed reference value.

DESCRIPTION OF THE PREFERRED EMBODIMENT

Figure 1:
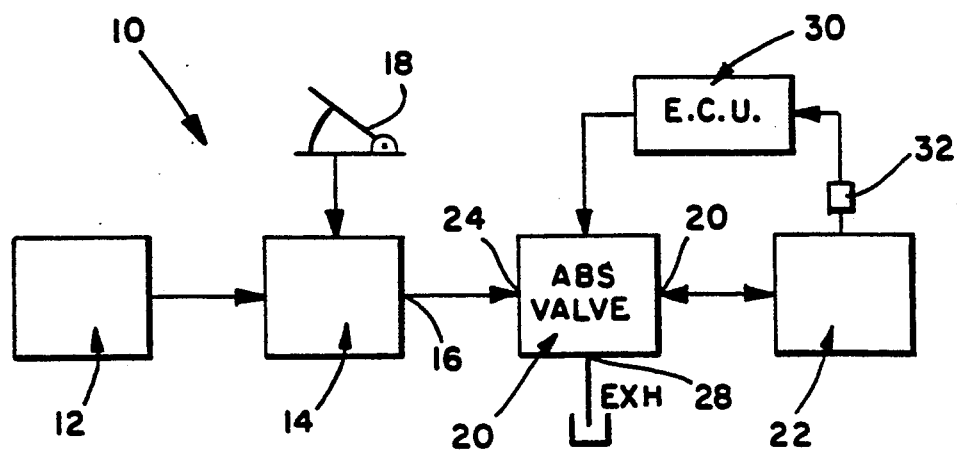
FIG. 1 is a schematic representation of a typical vehicular ABS.

ABS, i.e. Anti-lock brake systems, are well known in the prior art as may be seen by reference to the above-mentioned U.S. patents. A schematic illustration of a typical vehicular ABS may be seen by reference to FIG. 1. ABS 10 includes a source of pressurized fluid 12, which in heavy duty vehicles is typically a brake wet tank supplied with pressurized fluid by the on-board vehicle compresser, a brake treadle valve 14 which will provide pressurized fluid at its outlet 16 having a pressure substantially proportional to the displacement of the operator's brake pedal 18 and an ABS valve 20 interposed between the treadle valve 14 and the actuators of the pressurized fluid actuated brake system 22. The ABS valve 20 includes an inlet 24 connected to the outlet of the brake treadle valve 14, a utilization port 26 fluidly connected to the vehicle brake system 22 and a port 28 connected to an exhaust, such as to atmosphere. The ABS valve 20 is controlled by a controller, such as electronic control unit 30, which receives input signals from one or more wheel speed sensors 32.

Typically, the ABS valve will include one or more valving elements, often solenoid control valving elements, for selectively establishing or blocking fluid flow between the various ports thereof. A typical ABS valve will have a first mode of operation, often referred to as fast fill, wherein the inlet port 24 is directly or substantially connected to the port 26 while the exhaust port 28 is blocked, a second mode of operation, often referred to as slow or modulated fill, wherein the inlet port 24 is connected to the outlet port 26 through a restricted passage and/or the exhaust port is partially opened to provide a reduced flow of pressurized fluid from the treadle valve 14 to the brake system 22 and a third mode of operation, often referred to as exhaust or release, wherein the inlet port 24 is blocked from the port 26 and the port 26 is connected to the exhaust port 28 for rapidly exhausting built up fluid pressure in the brake system 22 to cause a release of the vehicle brakes. ABS valves may also have a forth mode of operation, often referred to as a hold mode, wherein port 26 is blocked to maintain the fluid pressure in the brake system actuators at a substantially constant level of pressurization. Of course, the modulated or slow fill mode of operation and/or the hold mode of operation may be achieved by a pulse width modulation control of the various ABS valve valuing members. ABS valves for providing the modes of operator described above are well known to the prior art as may be seen by reference to above-mentioned U.S. Pat. Nos. 3,880,474; 3,881,779; 3,929,383; 4,585,280 and 4,762,375; and the specific structural details of the ABS valve forms no part of the present invention.

As is also well known, the general purpose of an ABS is to improve a preselected combination of vehicle retardation and vehicle stability conditions by selective modulation of the actuating force applied to selected vehicular brakes. This is generally accomplished by sensing conditions indicative of an actual or eminent wheel-lock condition and responding thereto by releasing the vehicular brakes to allow the wheels to roll up to a given percentage of vehicle speed and to then reapply the brakes as soon as possible, often in a modulated manner, until such time as conditions indicative of actual or eminent wheel-lock condition are again sensed.

Figure 2:
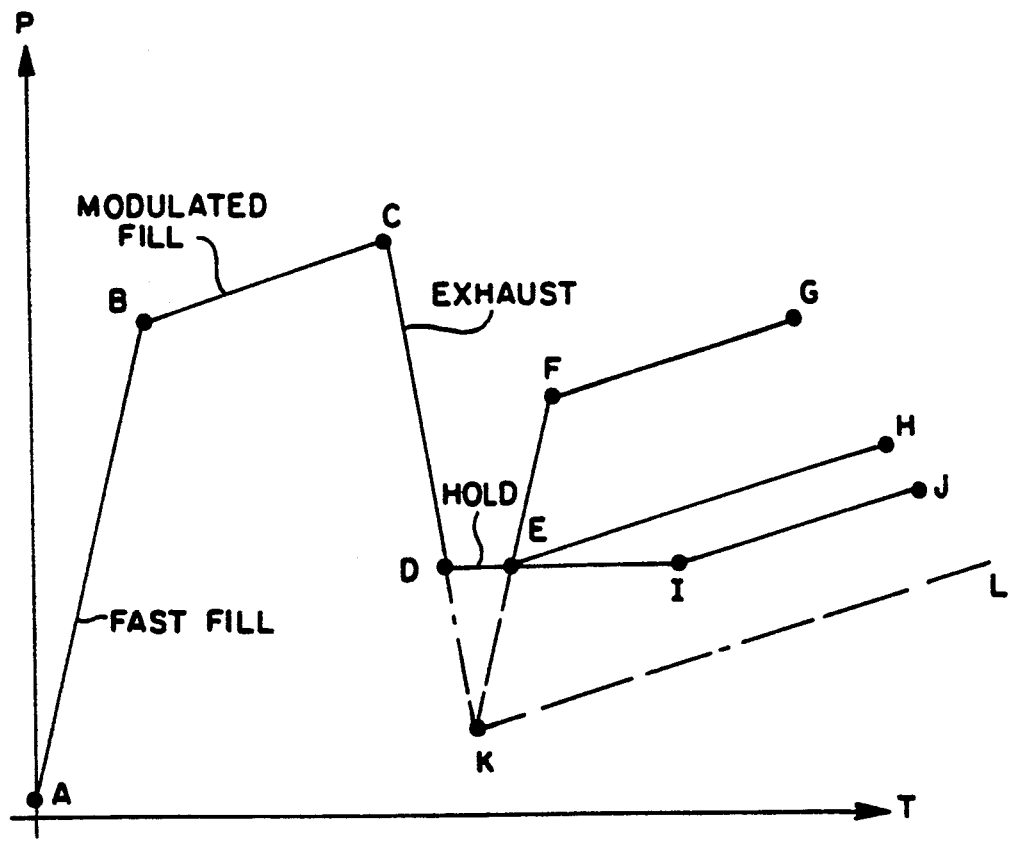
FIG. 2 is a graph illustrating the brake apply pressure vs. time curve(s) for the ABS control system/method of the present invention.

A graph illustrating the brake apply pressure vs. time curve for an ABS as controlled by the ABS control system/method of the present invention may be seen by reference to FIG. 2. Starting at initiation, of a vehicular braking operation, at point A, the ABS valve will assume or remain in its normally open, i.e., default, mode of operation, which is the fast fill mode of operation, and brake apply pressure will be allowed to build up until such time as conditions indicative of an actual or impending wheel-lock condition are sensed, such as at point C. Preferably, as is illustrated in FIG. 2, an intermediate point, point B, will be sensed which is a condition of a not quite eminent wheel-lock condition but for control purposes is a point wherein it is desirable that the ABS valve assume the slow fill condition until such time that pending or actual wheel-lock conditions are sensed.

In the control system/method of the present invention, the control parameter inputs to the ECU 30 comprise one or more wheel speed signals. In the event that two or more wheel speed signals are utilized to control two or more braking sites as a unit, a specific one of the signals, such as, for example, the highest wheel speed signal, will be the signal utilized for control purposes.

In the ABS control system/method of the present invention, upon initiation of a braking event, braking pressure is allowed to rise on a fast fill basis from point A to point B. The ECU 30, which has circuitry and/or logic rules for calculating wheel acceleration from the wheel speed signal input, will compare sensed wheel acceleration (actually wheel deceleration which will be a negative wheel acceleration) with a first reference value, $REF_1$, until such time as wheel acceleration is less than the first reference value $REF_1$. When wheel acceleration falls below the $REF_1$ value, the ABS valve 20 will be caused to assume its modulated or slow fill mode of operation as may be sean by reference to line BC. $REF_1$ is an empirically developed value which varies directly with a sensed, calculated or estimated vehicle speed. By way of example, for heavy duty vehicles, a value of $REF_1$ ranging from about $-0.7G$ for a slowly moving vehicle to about $-1.3G$ for a relatively rapidly moving vehicle as proven satisfactory. (G equals about 32.2 ft./sec$^2$).

After wheel deceleration has been found to be less than $REF_1$, applied pressure will be allowed to build up at a modulated fill rate until such time that wheel deceleration becomes less than a second reference value $REF_2$. When wheel deceleration becomes less than the $REF_2$ value, See point C, conditions indicative of an actual or eminent wheel-lock up are believed to exist and apply pressure in the vehicle brake system actuators is immediately exhausted by causing the ABS valve to assume the exhaust mode of operations thereof. The value of $REF_2$ is also an empirically developed value which varies inversely with actual or estimated vehicle speed. By way of example, for heavy duty vehicles, a value of $REF_2$ of $-1.5G$ for slowly moving vehicles to $-3.0G$ for relatively rapidly moving vehicles is found to be acceptable. As may.be seen, the absolute value of $REF_1$ is generally about one-half the absolute value of $REF_2$.

Referring to FIG. 2, the solid line curve of apply pressure vs. time is utilized for an ABS system of the type having a hold function whereas the dotted line curve illustrates the modifications necessary for those ABS systems not having a hold function.

Upon sensing conditions indicative of an actual or impending wheel-lock condition, the apply pressure at the vehicle brake actuators as exhausted, releasing the vehicle brakes and allowing the wheels to begin to roll up to vehicle speed. Assuming an ABS having a hold position, the ABS valve is maintained in the exhaust position until such time that it becomes apparent that the brake actuators are sufficiently exhausted such that the wheels have begun to roll up to speed. This is sensed by comparing the wheel acceleration to a third reference value, $REF_3$ and going from the release mode of operation to the hold mode of operation if wheel acceleration is equal or greater than See Point D. $REF_3$ is an empirically determined value which in the case of heavy duty trucks has a value of about 0.4G. Briefly, a wheel acceleration of about 0.4G is an indication that the vehicle brakes have been sufficiently released for the wheels to roll up, and by going to a hold rather than to a release position, reapplication of the brakes can occur in a more rapid fashion as the otherwise additionally release pressure will not have to be made up again.

The ABS valve is maintained in the hold position until conditions indicative of the vehicle wheels having rolled up to almost (i.e., about 70-80%) vehicle speed is sensed at which point in time (See point E) a decision as to possible reapplication of the brakes and, if the brakes are to be reapplied, at what rate of pressure increase is made. This reapplication decision point, point E, is determined by comparing the sensed :;heel speed to a reference wheel speed, $REF_4$. If the sensed wheel speed exceeds the reference wheel speed, REF$_4$, then the control logic will make further comparisons, to be described in greater detail below, as to possible pressure reapplication and desirable pressure reapplication rate.

REF$_4$ has a value equal to the greater of (i) a given percentage, about 75%, of the high wheel speed, or (ii) the last calculated value of REF$_4$ subject to a given decay rate (about −0.5G). The determination of REF$_4$ may be better appreciated by referenced to FIG. 3 which is a graph of wheel speed vs. time. Assuming a braking event occurs at time 0 when wheel speed=X, line 36 will represent the 0 slip wheel speed at assume vehicle velocity, line 38 will represent previously calculated REF$_4$ values decayed at a rate of approximately 0.5G, line 40 will represent measured wheel velocity while line 42 will represent a given percentage, about 75%, of measured wheel velocity. In this very typical example, the value of REF$_4$ will be the value of line 38 from X to Y and the value of line 42 from Y to Z. It is noted that line 40 is the value of the measured high wheel speed which is not necessarily the wheel controlled by the ABS valve 20.

Upon reaching the decision point E, the control logic will perform, in sequence, three comparisons of the measured wheel acceleration to different reference values to determine the appropriate action to take as to possible reapplication of the actuating pressure to the vehicle brake system. First, the measured acceleration will be compared to a relatively high reference, REF$_5$, and if acceleration is equal to or greater than REF$_5$, the ABS system will reapply the brakes at the fast fill mode of operation as represented by line EF. REF$_5$ is of a relatively high value, approximately 3G, and is representative of the wheel acceleration expected on a high friction surface when the wheel speed equals REF$_4$. When the wheel acceleration is not equal to or greater than REF$_5$ the wheel speed acceleration is then compared to a lower reference value REF$_6$ and if the wheel acceleration is greater than REF$_6$ vehicle brakes are reapplied at a slow fill or modulated fill rate of pressure increase, See line EH. REF$_6$ is selected at an intermediate value, say 2G, which, when the vehicle speed is equal to the REF$_4$ would be indicative of operation on an intermediate friction surface. If the wheel acceleration is less than REF$_6$, it is taken as an indication that the vehicle is operating on a relatively low friction surface and the vehicle brakes are retained in the hold position until such time as wheel acceleration is less than a relatively low reference value, REF$_7$, which will have a value of about 0 to .1G which is indicative of a very low slip condition when it is relatively safe on a low friction surface to begin reapplying the brakes. At that time, point I, the brakes are reapplied in a modulated manner.

It is noted that points F and G are determined by the same logic utilized to determine point B and C, respectively.

Should the ABS valve 20 in the ABS system controlled by the control system/method of the present invention not have a hold mode of operation, upon determination of an actual or eminent wheel-lock condition, point C, the vehicle brakes will be maintained in the exhaust condition until such time, point K, until such time that (I) the sensed wheel speed is equal to or greater than REF$_4$ and wheel acceleration is equal to or greater than Ref$_5$ in which case the brakes will be reapplied on the fast fill method of operation, See K, E, F or, until such time that wheel speed is equal to or greater than REF$_4$ and wheel acceleration is equal to or greater than REF$_6$ or less than REF$_7$ at which point the brakes will be reapplied on the modulated or slow fill basis. See line KL.

It may be seen by reference to the above, that a control system/method for an ABS system utilizing wheel speed as the control input parameter thereof is provided with pressure reapply logic, including the timing and the rate of pressure reapplication, which is suited for either one of high friction surface, intermediate friction surface or low friction surface operation.

It is noted that the fast fill may be somewhat modulated relative to a fully opened valve and thus the rate of fill illustrated by line portion AB may be at a slightly greater increase than the rate of pressure increase illustrated by line EF. However, for purposes of this description, both the wide open and fast fill modes of operation will be considered as substantially identical.

While the preferred form of the present invention has been described with a certain degree of particularity, it is understood that various modifications thereof are possible without departing from the spirit and the scope of the invention as hereinafter claimed.

I claim:

1. An ABS control method for controlling a vehicular ABS of the type comprising an ABS valve (20) connected in series between a treadle valve device (14) and at least one fluid pressure operated vehicle brake actuators for applying and releasing vehicular brakes (22), said ABS valve controlled by a control unit (30) having means for receiving a control parameter input indicative of the rotational speed of at least one vehicle wheels, means to determine a control parameter indicative of rotational acceleration of said at least one vehicle wheels and predetermined logic rules for processing said rotational speed and acceleration control parameters and for issuing command output signals to said ABS valve, said ABS valve having at least a relatively fast fill position (A-B) wherein substantially all pressurized fluid from sad treadle valve is passed to said at least one brake actuators, a relative slow fill position (B-C) wherein a reduced modulated amount of pressurized fluid is passed to said at least one brake actuators and an exhaust position (C-D) wherein fluid pressure acting on said at least one brake actuators is exhausted to cause the release of said vehicular brakes, said control unit effective upon sensing conditions indicative of an actual or incipient wheel-lock condition (C) to cause said ABS valve to assume the exhaust position thereof, said method characterized by:

after the ABS valve has been caused to assume said exhaust position, preventing an increase in the pressurization of pressurized fluid applied to said at least one brake actuators until sensed wheel rotational speed exceeds a first reference value (REF$_4$) then, when sensed wheel rotational speed exceeds said first reference value, causing said ABS valve to assume the fast fll position thereof it wheel rotational acceleration exceeds a second reference value (REF$_5$), causing said ABS valve to assume the slow fill position thereof if wheel rotational acceleration is less than said second reference value but greater than a third reference value (REF$_6$), and if wheel rotational acceleration is less than said third reference value continuing to prevent an increase in pressurization of said fluid until wheel rotational acceleration is less than a fourth reference value (REF$_7$) then, when wheel rotational acceleration is less than said fourth reference value, causing said ABS valve to assume the slow fill condition thereof, sad second reference value being greater than said third reference value and said third reference value being greater than said fourth reference value.

2. The control method of claim 1 wherein said control unit receives control parameter inputs indicative of the rotational speed of at least two vehicle wheels, said first reference value is the greater of (i) a given percentage of the sensed rotational speed of one of said at least two wheels rotating at least as fast as any other of said at least two wheels or (ii) a previously determined value of the first reference decayed at a predetermine rate.

3. The control method of claim 2 wherein said predetermined rate corresponds to a change in wheel rotational speed when vehicle deceleration is approximately −0.5G.

4. The control method of claim 3 wherein said control unit receives input signals indicative of the rotational speed of said at least two vehicular wheels and the rotational speed of one of said at least two wheels rotating at least as fast as any other of said at least two wheels is compared to said first reference value and the rotational acceleration of said wheel rotating at least as fast as any other of said at least two wheels is compared to the second, third and fourth references.

5. The control method of claim 3 wherein said control unit receives input signals indicative of the rotational speed of said at least two wheels and the rotational speed of one of said at least two wheels rotating no faster than any other of said at least two wheels is compared to said first reference value and the rotational acceleration of said wheel rotating no faster than any other of said at least two wheels is compared to the second, third and fourth references.

6. The control method of claim 3 wherein said control unit receives control parameter input signals indicative of the rotational speed of more than one wheel and an average rotational speed of said at least two wheels is compared to the first reference and an average rotational acceleration of said at least two wheels is compared to the second, third and fourth references.

7. The control method of claim 1, 2, 3, 4, 5 or 6 wherein the second reference, third reference, and fourth reference, respectively, are wheel accelerations indicative of relatively high friction surface, relatively intermediate surface friction, and relatively low friction surfaces, respectively.

8. The control method of claim 7 wherein said second reference corresponds to a wheel acceleration value when vehicular acceleration is about 3G, said third reference corresponds to a wheel acceleration value when vehicular acceleration is abut 2G, and said fourth reference corresponds to a wheel acceleration value when vehicular acceleration is about 0.1–0.0 G.

9. The control method of claims 1, 2, 3, 4, 5 or 6 wherein said ABS valve has a selectable hold position wherein the level of pressurization of the actuating fluid in the at least one brake actuators is maintained at a substantially constant level, said ABS valve caused to assume said hold position from said exhaust position when said wheel acceleration is greater than a fifth reference value (REF$_3$), said fifth reference value being greater than said fourth reference value and less than said third reference value.

10. The control method of claim 9 wherein said fifth reference value corresponds to a wheel acceleration value when vehicular deceleration is in the range of 0.06–0.03G.

11. An ABS control system for controlling a vehicular ABS of the type comprising an ABS valve (20) connected in series between a treadle valve device (14) and at least one fluid pressure operated vehicle brake actuators for applying and releasing vehicular brakes (22), said ABS valve controlled by a control unit (30) having means for receiving a control parameter input indicative of the rotational speed of at least one vehicle wheels, means to determine a control parameter indicative of rotational acceleration of said at least one vehicle wheels and predetermined logic rules for processing said rotational speed and acceleration control parameters and for issuing command output signals to said ABS valve, said ABS valve having at least a relatively fast fill position (A-B) wherein substantially all pressurized fluid from said treadle valve is passed to said at least one brake actuators, a relatively slow fill position (B-C) wherein a reduced modulated amount of pressurized fluid is passed to said at least one brake actuators and an exhaust position (C-D) wherein fluid pressure acting on said at least one brake actuators is exhausted to cause release of said vehicular brakes, said control unit effective upon sensing conditions indicative of an actual or incipient wheel-lock condition (C) to cause said ABS valve to assume the exhaust position thereof, said control system characterized by:

means effective, after the ABS valve has been caused to assume said exhaust position, for preventing an increase in the pressurization of pressurized fluid applied to said at least one brake actuators until sensed wheel rotational speed exceeds a first reference value (REF$_4$) the, when sensed wheel rotational speed exceeds said first reference value causing said ABS valve to assume the fast fill position thereof if wheel rotational acceleration exceeds a second reference value (REF$_5$), causing said ABS valve to assume the slow fill position thereof if wheel rotational acceleration is less than said second reference value but greater than a third reference value (REF$_6$), and, if wheel rotational acceleration is less than said third reference value, continuing to prevent an increase in pressurization of sad fluid until wheel rotational acceleration is less than a fourth reference value (REF$_7$) then, when wheel rotational acceleration is less than said fourth reference value, causing said ABS valve to assume the slow fill condition thereof, said second reference value being greater than said third reference value and said third reference value being greater than said fourth reference value.

12. The control system of claim 11 wherein said control unit receives control parameter inputs indicative of the rotational speed of at least two vehicle wheels, said first reference value is the greater of (i) a given percentage of the sensed rotational speed of one of said at least two wheels rotating at least as fast as any other of said at least two wheels or (ii) a previously determined value of the first reference decayed at a predetermined rate.

13. The control system of claim 12 wherein said predetermined rate corresponds to a change in wheel rotational speed when vehicle deceleration is approximately −0.5G.

14. The control system of claim 13 wherein said control unit receives input signals indicative of the rotational speed of said at least two vehicular wheels and the rotational speed of one of said at least two wheels rotating at least as fast as any other of said at least two wheels is compared to said first reference value and the rotational acceleration of said wheel rotating at least as fast as any other of said at least two wheels is compared to the second, third and fourth references.

15. The control system of claim 13 wherein said control unit receives input signals indicative of the rotational speed of said at least two wheels and the rotational speed of one of said at least two wheels rotating no faster than any other of said at least two wheels is compared to said first reference value and the rotational acceleration of said wheel rotating no faster than any other of said at least two wheels is compared to the second, third and fourth references.

16. The control system of claim 13 wherein said control unit receives control parameter input signals indicative of the rotational speed of more than one wheel and an average rotational speed of said at least two wheels is compared to the first reference and an average rotational acceleration of said at least two wheels is compared to the second, third and fourth references.

17. The control system of claims 11, 12, 13, 14, 15 or 16, wherein the second reference, third reference and fourth reference, respectively, are wheel accelerations indicative of relatively high friction surface, relatively intermediate surface friction, and relatively low friction surfaces, respectively.

18. The control system of claim 17 wherein said second reference corresponds to a wheel acceleration value when vehicular acceleration is about 3G, said third reference corresponds to a wheel acceleration value when vehicular acceleration is about 2G, and said fourth reference corresponds to a wheel acceleration value when vehicular acceleration is about 0.1–0.0G.

19. The control system of claims 11, 12, 13, 14 15 or 16 wherein said ABS valve has a selectable hold position wherein the level of pressurization of the actuating fluid in the at least one brake actuators is maintained at a substantially constant level, said ABS valve caused to assume said hold position from said exhaust position when said wheel acceleration is greater than a fifth reference value ($REF_3$), said fifth reference value being greater than said fourth reference value and less than said third reference value.

20. The control system of claim 19 wherein said fifth reference value corresponds to a wheel acceleration value when vehicular acceleration is in the range of 0.06–0.03G.

* * * * *